May 13, 1924.  
O. L. ROUTT  
1,493,899  
MACHINE FOR MANUFACTURING PLASTER BOARD AND THE LIKE  
Filed Jan. 29, 1923
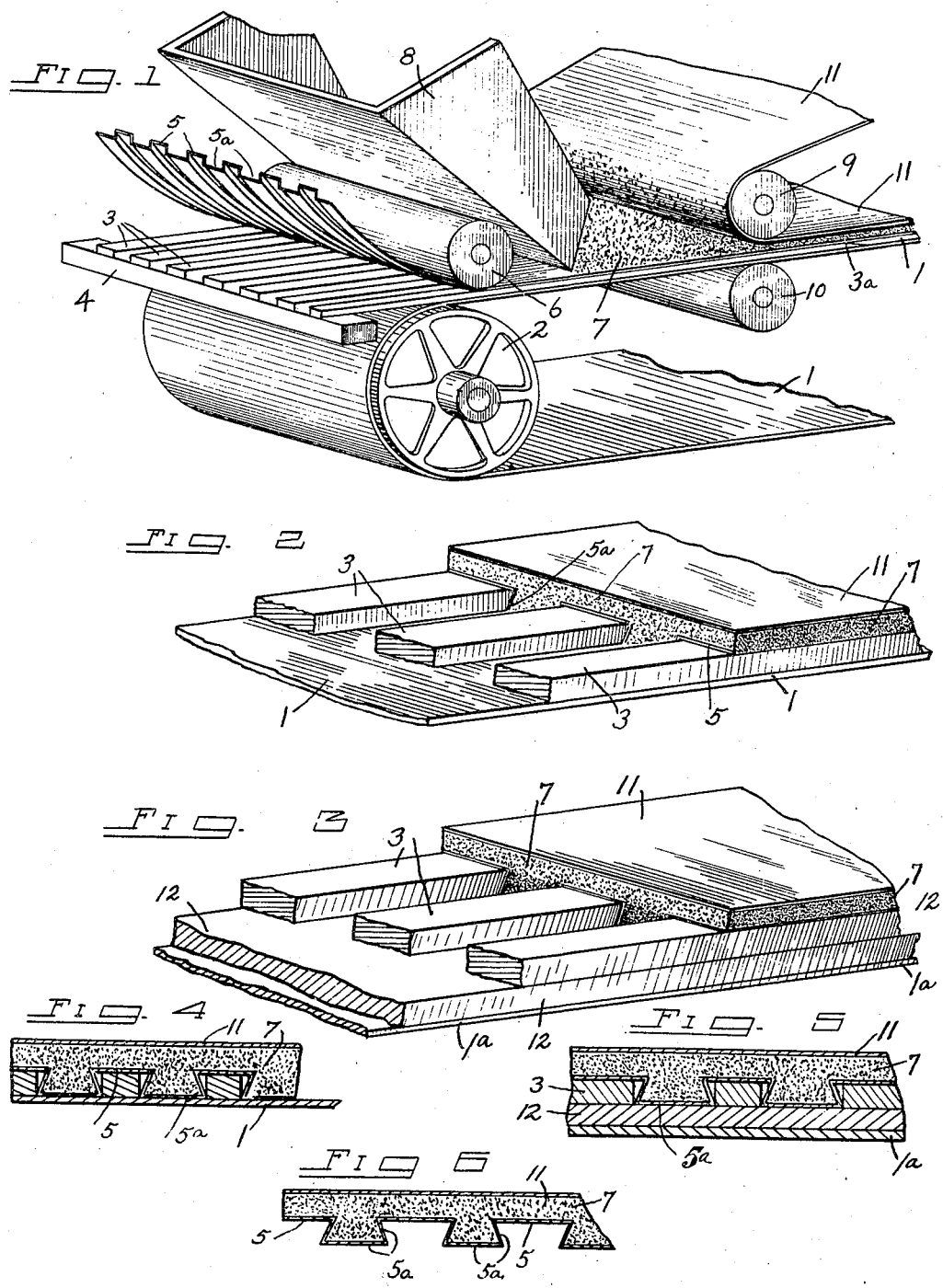
INVENTOR  
Orville L. Routt.  
By His Attorney.

Patented May 13, 1924.

1,493,899

UNITED STATES PATENT OFFICE.

ORVILLE L. ROUTT, OF LOS ANGELES, CALIFORNIA.

MACHINE FOR MANUFACTURING PLASTER BOARD AND THE LIKE.

Application filed January 29, 1923. Serial No. 615,635.

*To all whom it may concern:*

Be it known that I, ORVILLE L. ROUTT, a citizen of the United States, residing in the city of Los Angeles, county of Los Angeles, and State of California, have invented certain Improvements in Machines for Manufacturing Plaster Board and the like, of which the following is a specification.

My invention relates to machines of the character illustrated in my United States Letters Patent No. 1,348,898, of August 10, 1920, in which plastic material is moulded into a forming sheet having parallel strips or tongues, and in which a traveling belt or member having spaced strips is used to receive the forming sheet as the plastic matter is pressed thereinto.

The principal object of my improvements is to provide a construction in which forming sheets can be used as before, but instead of a traveling belt or member having spaced strips thereon and moving therewith, I provide stationary strips between which the parallel channel portions of the forming sheet move to receive the plastic material, with a smooth flat belt or platform under the strips, whereby said forming sheet slides over the strips as the plastic matter is forced into its channel portions, and the formed plaster board is either carried away on a flat belt, or is moved over a flat smooth surface to the place of deposit.

In order to clearly explain my invention, I have illustrated the same on the accompanying sheet of drawings, which I will now describe.

Figure 1 is a fragmentary, perspective view of a machine in which my invention is embodied;

Figure 2 is a fragmentary view showing the formed plaster board, the stationary strips and a smooth belt movable thereunder;

Figure 3 is a similar view showing the plaster board, the stationary strips, and a smooth flat board or platform under the strips and on which the formed plaster board slides, with a belt under the board for carrying the formed plaster board away as it comes from between the rollers; and Figures 4, 5 and 6 are cross sectional views.

Referring in detail to the drawings, 1, designates a flat carrier belt, traveling over a roller, 2. Mounted above the belt 1, is a series of spaced strips, 3, secured to a part of the main frame, as at 4, said strips being stationary, with the belt moving immediately thereunder, as indicated. A forming sheet, 5, having channel portions, $5^a$, formed therein, is fed over said strips, with the channel portions moving between said strips, said forming sheet moving under a roller, 6. Plastic material, 7, is fed onto said forming sheet 5, from a hopper, 8, and is carried between two forming rollers, 9 and 10, with a second sheet, 11, moving around the roller 9, and being pressed down on said plastic material 7, to form one side thereof, as will be clear from Fig. 1. The stationary strips 3, 3, extend forwardly between the rollers 9 and 10, and then taper down to the carrier belt, as at $3^a$, so that the formed plaster board moves with the carrier belt to the place of discharge.

In Figure 3, I have shown a stationary board or platform, 12, immediately under the strips 3, 3, with the channel parts of the forming sheet 5, extending down between said strips, 3, 3, and onto said board, 12, as indicated. As the plaster board is thus formed and rolled out forwardly between the forming rollers, 9 and 10, as before described, it slides over the strips 3, 3, and the board 12, and can be discharged onto a carrier belt, 1, as before, said carrier belt in this form of the invention being designated $1^a$.

It will be readily understood that by removing the stationary strips, 3, 3, from the machine and using smooth paper in place of the forming sheet, 5, that wall board can be made on the same machine, thus making it possible to make either wall board, or plaster board having the parallel strips or tongues, on the same machine.

I do not limit the invention to the showing here made for illustrative purposes, except as I may be limited by the hereto appended claims.

I claim:

1. Means for making plaster board and the like comprising a series of spaced strip members held stationary, means for feeding a forming sheet having channel portions formed therein on said strips with the channel portions between said strips, means for feeding plastic matter onto said forming sheet and into said channel portions, and means for rolling said plastic matter flat upon said sheet and into said channel portions.

2. Means for making plaster board and the like comprising a series of stationary, parallel strips, means for feeding a forming sheet having portions extending between said strips along upon said strips, a support immediately under said strips to be engaged by the portions of said forming sheet between said strips when filled with plastic matter, means for feeding plastic matter on to said forming sheet and into the portions between said strips, and means for pressing plastic matter down upon said forming sheet and between said strips and for moving it forwardly in a flat form along said strips.

3. Means for making plaster board having spaced parallel channel portions comprising in combination, a series of spaced parallel stationary strip members, a supporting member immediately under said strip members, means for feeding a forming sheet having spaced parallel channel portions along on said strip members with said channel portions between said strip members and engaging with said supporting member, means for feeding and pressing a plastic matter down upon said forming sheet and into said channel portions, and means for feeding a second sheet upon said plastic matter as it is pressed into flat form on said forming sheet, and moved along upon said strip members.

4. Means for making plaster board of the character referred to comprising in combination with a forming sheet having channel like portions formed therein, of a support adapted to receive said forming sheet with corresponding spaces to receive the channel portions thereof, said support being stationary for said forming sheet to move upon, means for feeding a plastic matter onto said forming sheet and into its channel like portions, means for rolling said plastic matter into flat form and for moving it and said forming sheet along said support as formed, and means for feeding a top sheet upon said plastic matter.

5. In a machine for making plaster board and the like, a series of stationary strips, a carrier member with means for moving the same beneath said strips, a forming sheet having channel portions formed therein adapted to move on said strips with said channel portions between said strips and on said carrier member, means for feeding a plastic matter onto said forming sheet, a second sheet, a roller for pressing said second sheet down upon said plastic matter and forming said plastic matter in said forming sheet, and for moving said forming sheet, plastic matter and second sheet forwardly as a finished article.

6. A machine for making plaster board and the like comprising a carrier member with means for moving the same, a series of spaced strip-like members adapted to be placed immediately above said carrier member and held in a fixed position, means for feeding a forming sheet along upon said strip-like members, means for feeding a plastic material upon said forming sheet, a roller for pressing said plastic material down upon said forming sheet and forcing it between said spaced strip-like members, and a top sheet adapted to be rolled upon said plastic material as it is moved forwardly under said roller.

7. A machine for making plaster board and the like comprising in combination a forming sheet with means for supporting the same, said supporting means having parallel spaced members fixed in said machine and upon which said forming sheet moves, means for feeding a plastic matter onto said forming sheet, a roller for pressing said plastic matter down onto said forming sheet and between the spaced members to form parallel portions on one side of said board, said roller also moving said plastic matter and said forming sheet forwardly upon said supporting means, and means for feeding a second sheet under said roller to form the surface of the other side of said board.

8. In combination, a flat conveyor, a series of spaced strip members supported in fixed relationship immediately above said flat conveyor, means for feeding a forming sheet along on said strips with portions thereof extending down between said strips, means for feeding plastic matter onto said forming sheet, a pair of rollers between which said forming sheet and said plastic matter is rolled, and means for feeding a second sheet under one of said rolls on the top of said plastic material, substantially as shown and described.

Signed at Los Angeles, Los Angeles County, California, this 23 day of January, 1923.

ORVILLE L. ROUTT.

Witnesses:
MARGUERITE L. WILBUR,
W. R. LITZENBERG.